UNITED STATES PATENT OFFICE.

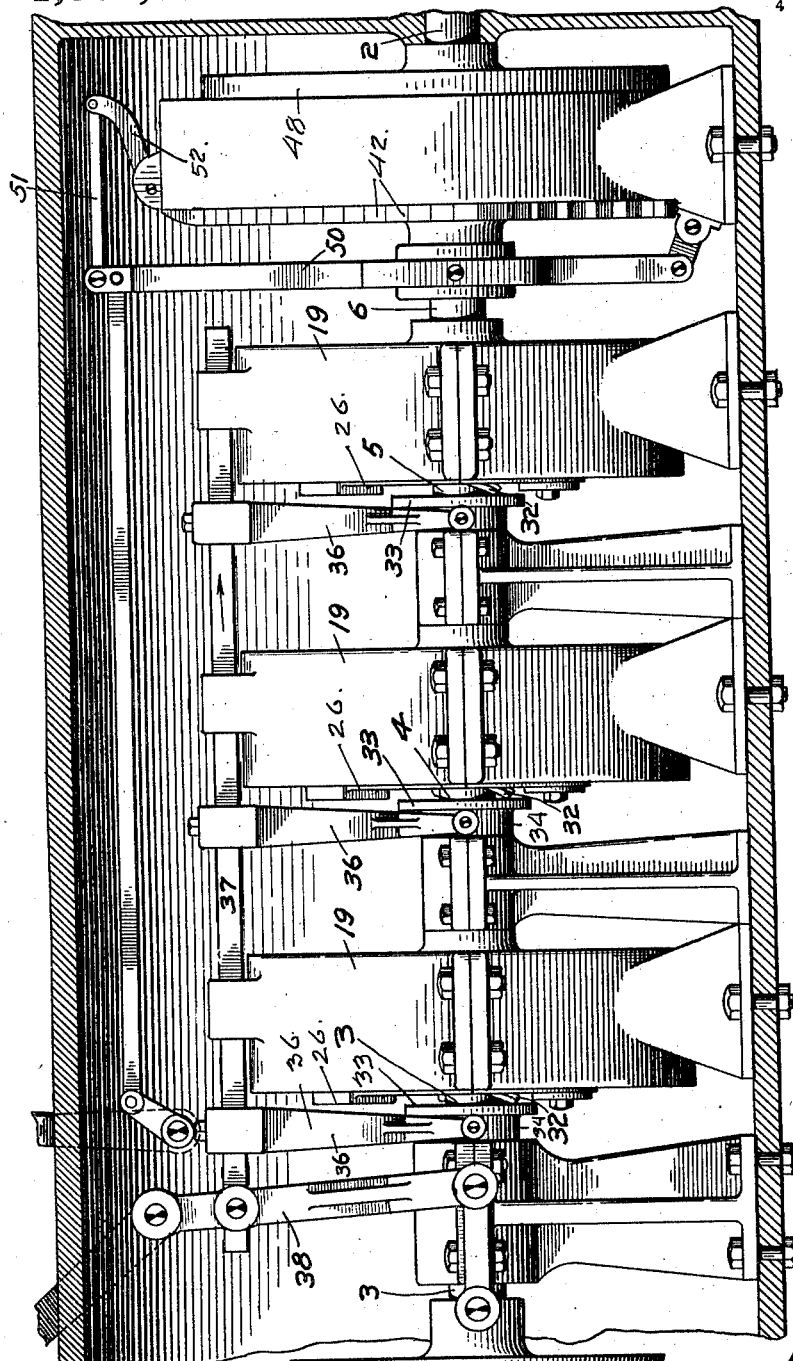

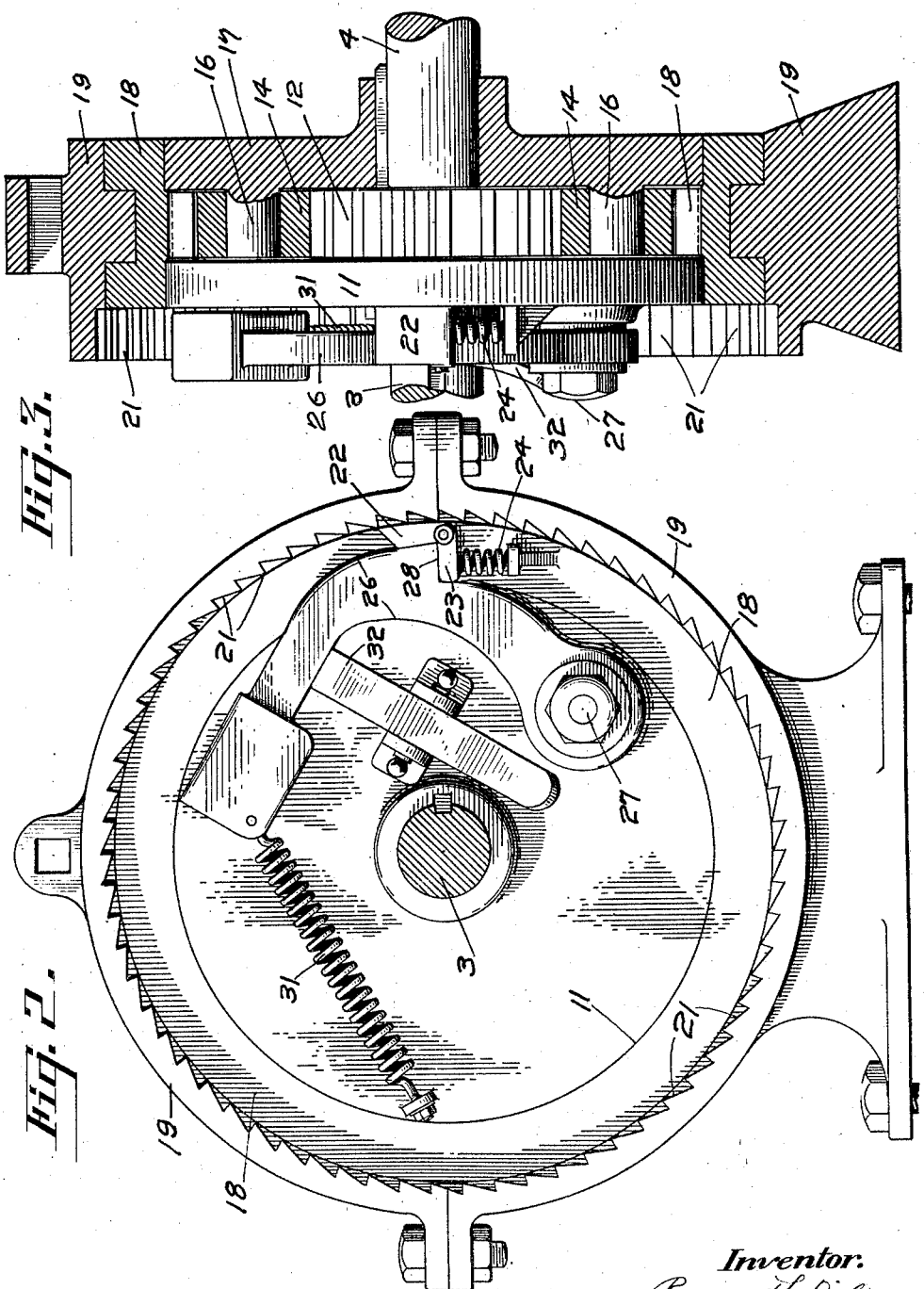

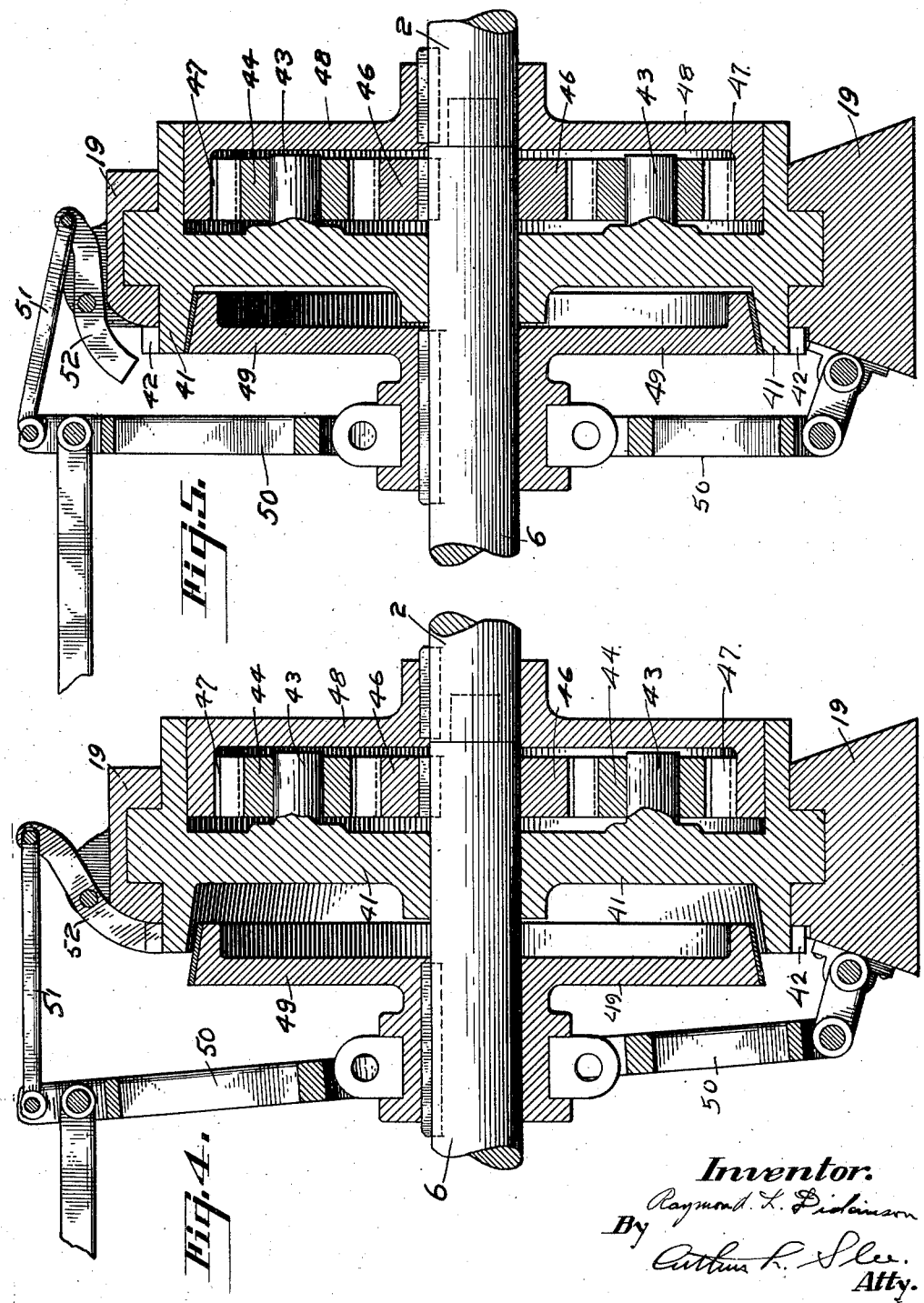

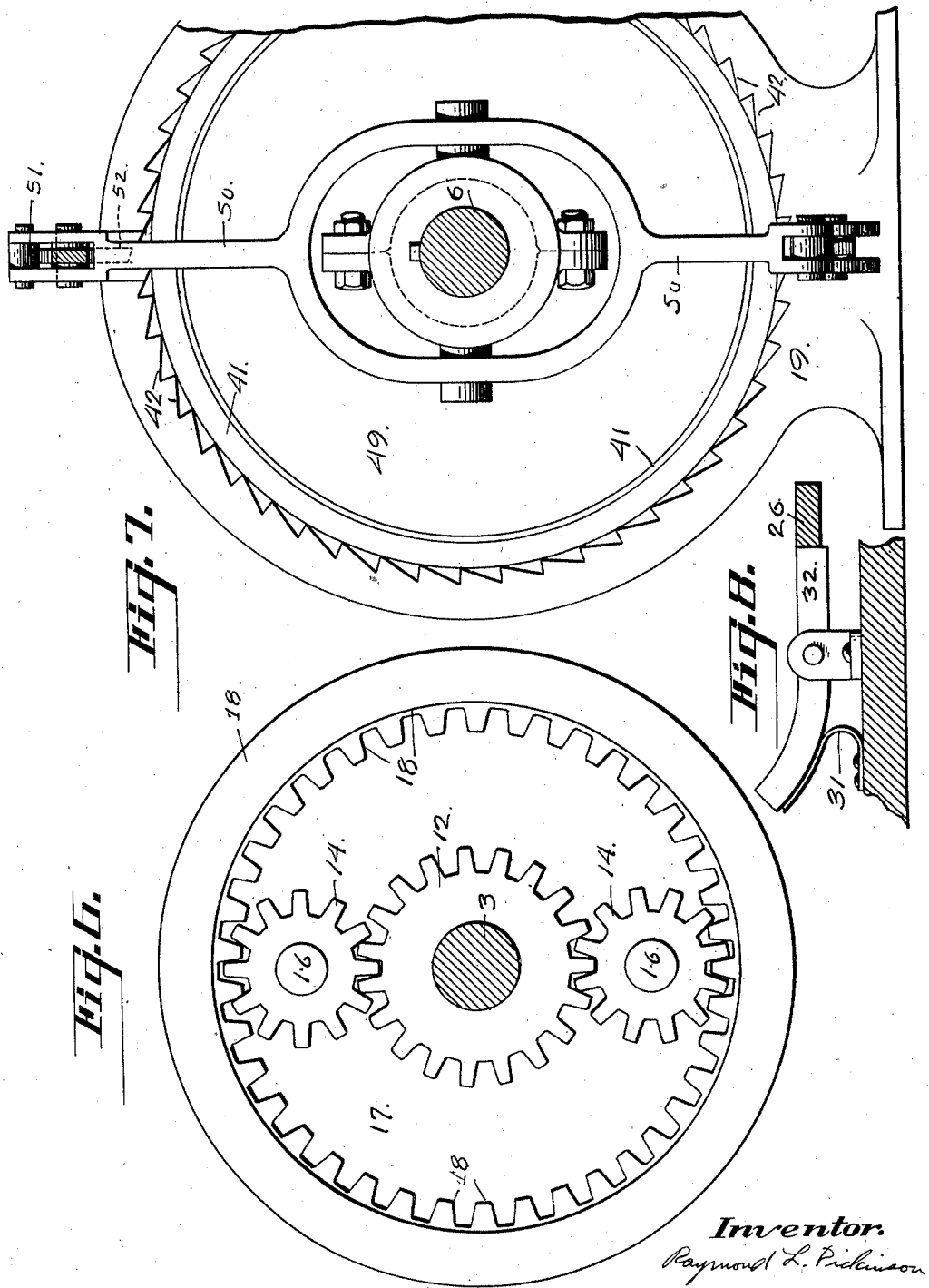

RAYMOND L. DICKINSON, OF RICHMOND, CALIFORNIA.

VARIABLE-SPEED TRANSMISSION.

1,302,775.   Specification of Letters Patent.   Patented May 6, 1919.

Application filed June 24, 1918.   Serial No. 241,705.

*To all whom it may concern:*

Be it known that I, RAYMOND L. DICKINSON, a citizen of the United States, residing at Richmond, in the county of Contra Costa and State of California, have invented a new and useful Improvement in Variable-Speed Transmissions, of which the following is a specification.

My invention relates to variable speed transmissions wherein a series of reduction gear mechanisms, connected to alined shaft sections, operate in conjunction with means for automatically rendering said mechanisms inoperative to drive said shaft sections at different speeds relatively to each other; and the objects of my invention are 1. To provide an improved variable speed mechanism;

2. To provide an improved variable speed transmission mechanism having automatic means for shifting the gears by the simple expedient of operating the clutch; and 3. To provide an improved device of the character described wherein automatic means are provided to automatically shift the ratio between the driving and driven shafts in proportion to the load on the driven shaft and the speed of the driving shaft.

I accomplish these several features by means of the device disclosed in the drawings forming a part of the present specification, wherein like characters of reference are used to designate similar parts throughout the said specification and drawings and in which—

Figure 1 is a broken sectional view through the housing of my improved transmission disclosing the arrangement of the reduction gearing, reversing mechanism and the clutch;

Fig. 2 is a front elevation of one of the reduction gearing mechanisms shown in a position where the same is inoperative as regards said gear reduction mechanism;

Fig. 3 is a vertical sectional view, partly in elevation, of Fig. 2;

Fig. 4 is a vertical sectional view of the reversing mechanism in an operative position;

Fig. 5 is a similar view disclosing the reversing mechanism in an operative position, Fig. 6 is a view disclosing the arrangement of the platentary gears in one of the reduction gearing mechanisms;

Fig. 7 is a broken front elevation of the reversing mechanism; and

Fig 8 is a detailed view of a spring retaining latch.

Referring to the drawings the numeral 1 is used to designate a driving shaft and 2 is a driven shaft in alinement therewith. A series of shaft sections 3, 4, 5, and 6 are arranged between the shafts 1 and 2 and alined therewith. A suitable clutch 7 is feathered to the end of the shaft section 3 and operates to engage a fly-wheel 8 upon the adjacent end of the driving shaft 1. The opposite end of the shaft section 3, as well as the shaft sections 4 and 5, is provided with a flange 11 and a gear 12 meshing with planetary pinions 14 rotatably mounted upon suitable trunnions or pins 16 preferably formed integral with an annular flange 17 upon the adjacent end of the shaft section 4.

As all of the adjacent ends of the shaft sections are similar, except the adjacent ends of the shaft section 6 and the driven shaft 2, it will only be necessary to describe one set.

An internal gear 18 meshes with the planetary pinions 14 and is rotatably mounted around them and in a suitable frame 19 provided with ratchet teeth 21, said teeth 21 being engaged, under certain conditions hereinafter more fully set forth, by a pawl 22 mounted upon the internal gear 18 and having a lateral extension 23 normally actuated by a spring 24 to retain the said pawl 22 in engaging relation with the teeth 21.

A weighted arm 26 is pivotally mounted upon each flange 11 as at 27, said arms being provided with shoulders 28 to engage the lateral extension 23 of the pawls 22 and thereby disengage said pawls 22 from engaging relation with the ratchet teeth 21 when the rotation of the shaft section 3 builds up sufficient centrifugal force to move the weighted arm 26 outwardly or radially against the tension of a spring 31 mounted upon the flange 11.

A pivoted latch 32 is normally operated by means of a spring 33 to drop behind the weighted arm 26 when thrown outwardly by centrifugal force and thereby retain the shoulder 28 in a position which will hold the pawl 22 from the teeth 21 of the housing 19.

The free end of the latch 32 is arcuate so as to extend beyond the surface of the annular flange 11 upon which it is mounted thus providing a lateral projection engageable by flanges 33 upon sliding collars 34 rotatably mounted upon the shaft sections 3, 4, and 5.

The collars 34 are mounted adjacent each reduction gearing and are all connected to each other by means of arms 36 upon a rod 37 slidably mounted within the housings 19 and connected to the operating lever 38 of the clutch 7.

Between the adjacent ends of the shaft section 6 and the driven shaft 2, I have provided a reversing mechanism which may be described as follows:

Upon the end of the shaft section 6 adjacent the driven shaft 2, I have provided a flange or member 41 having ratchet teeth 42 thereon. The flange or member 41 is also provided with trunnions or pins 43 upon which are rotatably mounted planetary pinions 44 meshing with a gear 46 upon the end of the shaft section 6. The pinions 44 are also in mesh with an internal gear 47 on a flange 48 secured to the end of the driven shaft 2. The flange or member 41 is rotatably mounted upon the shaft section 6 and also within the housing 19 similar to the housings 19 of the reduction gearing housings 19.

A clutch member 49 is feathered to the shaft section 6 and arranged to engage and rotate the member 41. The clutch 49 is operated by means of a suitable lever 50 operatively connected, by means of a connecting rod 51, to a latch 52 pivotally mounted upon the housing 19 and arranged to engage the ratchet teeth 42 of the member 41.

When the clutch member 49 is released from the member 41 the operating rod 50 operates to move the pawl 52 into engaging relation with the teeth 42 of the member 41 and thereby prevent rotation of said member. The gear 46 on the shaft section 6 will then rotate the flange 48 on the driven shaft 2 in an opposite direction and at a reduced speed, through the medium of the reversing planetary pinions 44 whose axes are held against rotation around the shaft 6 and driven shaft 2 by the action of the pawl 52, as disclosed in Fig. 4 of the drawings.

When the clutch member 49 is moved into engaging relation with the member 41 and pawl 52 is released from engagement with the teeth 42 of said member 41 the planetary pinions 44 are then rotated with the gear 46 and the shaft 6 thereby rotating the driven shaft 2 in the same direction and at the same speed as the shaft 6.

The operation of the automatic gear shifting device is as follows:

We will assume that the transmission is applied to a motor vehicle which is running on a level road in high gear or directly connected.

The gear reducing mechanisms will then be in the position disclosed in Figs. 2 and 3 of the drawings. That is, the annular gears 18 will all be locked to their respective shaft sections 3, 4 and 5 and rotated with said sections thereby locking the pinions 14 with said internal gears 18 and with the gears 12 on their respective shaft sections also.

Should the vehicle now approach a grade and slow down by reason of the additional load thereby encountered the gearing is reduced and the power increased through said reduction gearings by the simple expedient of throwing out or disengaging the clutch 7 from the fly-wheel 8.

The movement of the clutch operating lever 38 will move the rod 37 and arms 36 thereon in the direction indicated by the arrow in Fig. 1 of the drawings. This will cause all of the flanges 33 on the collars 34 to engage the arcuate ends of the latches 32 and thereby move the opposite ends of said latches away from the weighted arms 26. The springs 31 will then move the said weighted arms inwardly and the shoulders 28 thereon away from extensions 23 of the pawls 22. The springs 24 will then move the pawls 22 into engagement with the ratchet teeth 21 on the housings 19. The reaction or load will then tend to rotate the internal gears 18, upon which the pawls 22 are pivotally mounted, in the opposite direction but such rotation will be automatically prevented by said pawls 22.

All of the gears 12, on their respective shaft sections, will then rotate the planetary pinions 14 around the stationary internal gears 18 thereby rotating successive shaft sections each in the same direction and at a reduced speed. That is, assuming that all of the ratios between adjacent shaft section ends is similar or approximately three to one, it is obvious that the ratio between the shaft sections 4 and 6 will be nine to one, while the ratio between the shaft sections 3 and 6 will be twenty-seven to one. Therefore the shaft sections 3 will be rotated at a greater speed by the motor of the vehicle, not shown, by reason of a decrease of the load through the reduction gearings.

As the speed of the driven shaft 2 has been decreased through the various reduction gearings it is evident that a greater amount of power will be obtained.

The weighted arms 26 are designed to be operated at a given speed of the shaft sections to which they are connected.

Therefore if the grade or increased load encountered does not require the extreme ratio of twenty-seven to one the speed of the shaft section 3 will be sufficient to operate the weighted arm 26 by centrifugal force and thereby disengage the pawl 22 from the internal gear 18 and of the first housing 19 whereby the internal gear 18 and pinions 14 will be automatically locked, by the action of said weighted arm 26, and the shaft section 4 will then be rotated at the same speed as the shaft section 3 and the ratio between the shaft sections 3 and 6, or 4 and 6 will be nine to one. When the load of the vehicle is still further decreased the motor will then travel faster and thereby actuate the weighted arm 26 of the second housing whereby the reduction gearing in that unit will be automatically locked and the ratio between the driving shaft 1 and the driven shaft 2 will then be automatically reduced to a ratio of three to one. A further decrease in the load will cause an increase of speed of the driving shaft 1 and the several shaft sections 3, 4 and 5 and the weighted arm 26 of the third or last unit will be actuated to lock the reduction gearing therein and thereby directly connect all of the shaft sections with the driving shaft 1 and the driven shaft 2 and rotate said driven shaft 2 at the same speed as the driving shaft 1.

It is obvious from the foregoing that a movement to release the clutch 7 will automatically reduce the speed of the driven shaft 2, increase the speed and therefore the power of the driving shaft 1.

As the load is gradually decreased the several units or reduction gearings will be successively and automatically operated to reduce the gear ratio in proportion to the load.

Having thus described my invention what I claim as new and desire to secure by Letters Patent is—

1. A variable speed transmission comprising a driving and a driven shaft in alinement; a series of shaft sections alined with and between the driving and driven shafts; reduction gears operatively connected to adjacent ends of the shaft sections whereby one section may be driven at a reduced speed from one of the other sections and adapted to directly connect said shaft sections; and means for automatically operating the reduction gears to directly connect said shaft sections when the speed of the driven shaft is increased.

2. A variable speed transmission comprising a driving and a driven shaft in alinement; a series of shaft sections alined with and between the driving and driven shafts; reduction gears operatively connected to adjacent ends of the shaft sections whereby one section may be driven at a reduced speed from one of the other sections said reduction gears being also adapted to directly connect said sections; and means for automatically operating the reduction gears to directly connect the sections when the speed of the driven shaft attains a predetermined speed.

3. A variable speed transmission comprising a driving and a driven shaft in alinement; a series of shaft sections alined with and between the driving and driven shafts; reduction gears operatively connected to adjacent ends of the shaft sections whereby one section may be driven at a reduced speed from one of the other sections said reduction gears being also adapted to directly connect said sections; and means for automatically operating the reduction gears to directly connect the sections when the speed of the driven shaft attains a predetermined speed, and a suitable reversing mechanism connecting one of the shaft sections with the driven shaft and adapted to directly connect said section and driven shaft to rotate said driven shaft in the same direction and speed as the said section.

4. The combination with a variable speed transmission of a driving and a driven shaft in alinement; a reduction gear operatively connecting the driving and driven shafts whereby said driven shaft may be driven at a reduced speed from the driving shaft; means for normally retaining the reduction gearing in operative relation with the shafts; and means for automatically releasing the retaining means and locking the reduction gearing against operation when the speed of the driving shaft attains a predetermined speed whereby the shafts may be directly connected.

5. The combination with a variable speed transmission of a driving and a driven shaft in alinement; a reduction gear operatively connecting the driving and driven shafts whereby said driven shaft may be driven at a reduced speed from the driving shaft; means for normally retaining the reduction gearing in operative relation with the shafts; and means for automatically releasing the retaining means and locking the reduction gearing against the operation when the speed of the driving shaft attains a predetermined speed whereby the shafts may be directly connected, and means for locking the releasing means to retain the reduction gearing in a locked position.

6. The combination with a variable speed transmission of a driving and a driven shaft in alinement; a reduction gear operatively connecting the driving and driven shafts whereby said driven shaft may be driven at a reduced speed from the driving shaft; means for normally retaining the reduction gearing in operative relation with the shafts; and means for automatically releasing the retaining means and locking the reduction gearing against the operation when the speed of the driving shaft attains a predetermined speed whereby the shafts may be directly connected, and means for locking the releasing means to retain the reduction gearing in a locked position; and means for releasing the locking mechanism whereby the reduction gearing may be restored to operative relation with the shafts.

7. The combination with a variable speed transmission mechanism of a driving and a driven shaft in alinement; a gear secured to the end of the driving shaft; pinions rotatably mounted upon the driven shaft and meshing with the gear; an internal gear rotatably mounted around the pinions and meshing therewith to provide a reduction gearing whereby the driven shaft may be rotated at a reduced speed relatively to the driving shaft; means for normally locking the internal gear against rotation to retain the reduction gearing in operative relation to the shafts; and means for automatically releasing the locking mechanism and for connecting the internal gear to the driving shaft thereby locking the reduction gear against operation when driving shaft shall have attained a predetermined speed and directly connecting the driving and the driven shafts.

8. The combination with a variable speed transmission mechanism of a driving and a driven shaft in alinement; a gear secured to the end of the driving shaft; pinions rotatably mounted upon the driven shaft and meshing with the gear; an internal gear rotatably mounted around the pinions and meshing therewith to provide a reduction gearing whereby the driven shaft may be rotated at a reduced speed relatively to the driving shaft; means for normally locking the internal gear against rotation to retain the reduction gearing in operative relation to the shafts; and means for automatically releasing the locking mechanism and for connecting the internal gear to the driving shaft thereby locking the reduction gear against operation when the driving shaft shall have attained a predetermined speed and directly connecting the driving and the driven shafts; and means for operating the releasing means and restoring the reduction gearing to an operative relation with the shafts.

In witness whereof I hereunto set my signature.

RAYMOND L. DICKINSON.